US012250920B2

(12) United States Patent
Zhang et al.

(10) Patent No.: US 12,250,920 B2
(45) Date of Patent: Mar. 18, 2025

(54) CAT LITTER BOX CAPABLE OF AUTOMATIC CLEANING AND REMOVAL

(71) Applicant: SHANGHAI LIANCHONG INTELLIGENT TECHNOLOGY CO., LTD., Shanghai (CN)

(72) Inventors: Xiaolin Zhang, Shanghai (CN); Junkang Hu, Shanghai (CN)

(73) Assignee: SHANGHAI LIANCHONG INTELLIGENT TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/550,990

(22) PCT Filed: Mar. 13, 2023

(86) PCT No.: PCT/CN2023/080992
§ 371 (c)(1),
(2) Date: Sep. 18, 2023

(87) PCT Pub. No.: WO2023/185427
PCT Pub. Date: Oct. 5, 2023

(65) Prior Publication Data
US 2025/0031660 A1    Jan. 30, 2025

(30) Foreign Application Priority Data
Apr. 1, 2022   (CN) .......................... 202220816847.7

(51) Int. Cl.
*A01K 1/01*   (2006.01)
(52) U.S. Cl.
CPC ................... *A01K 1/0114* (2013.01)
(58) Field of Classification Search
CPC ............... A01K 1/0114; A01K 1/011
(Continued)

(56) References Cited

U.S. PATENT DOCUMENTS 5,048,464 A * 9/1991 Shirley ................ A01K 1/0114
209/362
5,107,797 A * 4/1992 LaRoche .............. A01K 1/0114
209/296

(Continued)

FOREIGN PATENT DOCUMENTS

| CN | 110169368 A | 8/2019 |
| CN | 211020441 U | 7/2020 |

(Continued)

OTHER PUBLICATIONS

PCT form PCT/ISA/210 (International search report) issued in PCT/CN2023/080992 on Mar. 13, 2023.

(Continued)

*Primary Examiner* — Yvonne R Abbott-Lewis
(74) *Attorney, Agent, or Firm* — McClure, Qualey & Rodack, LLP

(57) ABSTRACT

A cat litter box capable of automatic cleaning and removal, comprising a pedestal and a roller repository, and the pedestal and the roller repository are connected via a drive mechanism, the roller repository comprises a barrel, a litter storage bin is provided in the barrel, a pet entry/exit port and a waste discharge-port are opened on the barrel, wherein the waste discharge port is provided at a rotation track of the barrel, a movable cover is provided outside the waste discharge-port, an adjustable filter assembly is provided in between the litter storage bin and the waste discharge bin, the adjustable filter assembly comprises a fixed stopper-plate, the fixed stopper-plate is connected with an inner side of the barrel, a filter mesh is provided underneath the fixed stopper-plate, a movable stopper-plate is provided rotatably in between the fixed stopper-plate and the filter mesh, a button is provided at the movable stopper-plate.

13 Claims, 6 Drawing Sheets

(58) Field of Classification Search
USPC .......................................................... 119/161
See application file for complete search history.

(56) References Cited

U.S. PATENT DOCUMENTS

| | | | | |
|---|---|---|---|---|
| 5,507,252 A | * | 4/1996 | Ebert | A01K 1/0114 119/166 |
| 5,662,066 A | * | 9/1997 | Reitz | A01K 1/0114 119/163 |
| 5,752,465 A | * | 5/1998 | Page | A01K 1/0114 119/166 |
| 6,463,881 B2 | * | 10/2002 | Reitz | A01K 1/0114 119/170 |
| 7,487,742 B2 | * | 2/2009 | Waters | A01K 1/0114 119/161 |
| 8,413,608 B2 | * | 4/2013 | Sharp | A01K 29/00 119/166 |
| 8,757,094 B2 | * | 6/2014 | Baxter | A01K 1/011 119/168 |
| 11,432,525 B2 | | 9/2022 | Ma et al. | |
| 11,523,586 B2 | * | 12/2022 | Baxter | A01K 1/0114 |
| 11,944,066 B2 | * | 4/2024 | Ma | B07B 1/28 |
| 2002/0139312 A1 | * | 10/2002 | Reitz | A01K 1/0114 119/165 |
| 2007/0227457 A1 | * | 10/2007 | Waters | A01K 1/0114 119/166 |
| 2008/0017123 A1 | * | 1/2008 | Chin | A01K 1/011 119/166 |
| 2011/0088630 A1 | * | 4/2011 | Krotts | A01K 1/0114 119/166 |
| 2011/0214614 A1 | * | 9/2011 | Sharp | A01K 1/0107 119/166 |
| 2013/0019810 A1 | * | 1/2013 | Romano | A01K 1/0114 119/167 |
| 2013/0276714 A1 | * | 10/2013 | Bauer | A01K 1/0114 119/166 |
| 2013/0333625 A1 | * | 12/2013 | Baxter | A01K 1/011 119/166 |
| 2019/0166789 A1 | | 6/2019 | Turner | |
| 2020/0060221 A1 | * | 2/2020 | Fan | A01K 1/0114 |

FOREIGN PATENT DOCUMENTS

| | | |
|---|---|---|
| CN | 111837972 A | 10/2020 |
| CN | 211964995 U | 11/2020 |
| CN | 212368117 U | 1/2021 |
| CN | 217038344 U | 7/2022 |

OTHER PUBLICATIONS

PCT form PCT/ISA/237 (written opinion) issued in PCT/CN2023/080992 on Mar. 13, 2023.

* cited by examiner

CAT LITTER BOX CAPABLE OF AUTOMATIC CLEANING AND REMOVAL

TECHNICAL FIELD

The present invention relates to the technical field of pet products, especially a cat litter box capable of automatic litter cleaning and removal.

BACKGROUND TECHNOLOGY

Cat litter boxes are primarily lavatories for pet cats and utensils that make it convenient to handle metabolic wastes of pets, therefore, for pet cat feeders, cat litter boxes are essential. With the increase of the number of pet cat feeders, more and more automatic cat litter boxes are used. For conventional cat litter boxes, the cat litter is kept in a repository, when a cat comes to relieve itself, the clean litter and the litter stained with feces and urine will be screened and separated by a screen, the metabolic wastes together with the stained litter will roll on the screen and fall into a ready refuse bag so as to realize automatic litter scooping.

Although in the abovementioned manner the stained litter has been removed, that is, the function of automatic metabolic waste collection is done, the litter in the litter box need replacement, that is, upon usage for a period of time, all the litter in the litter box is to be removed and replaced with new litter.

Targeting at the foregoing problem, there were some improvements made in the prior art, for example, a Chinese utility model patent filed on Feb. 9 2021 with a publication number CN212487834U has disclosed a flipping filtering cat litter box, wherein the cat litter box comprises a cat litter box and a feces collection bag, a main cavity is provided in the cat litter box, a filter screen is provided in the main cavity, the filter screen divides the main cavity into a front cavity and a rear cavity, an entry/exit and a feces discharge port are respectively provided at a front end and a top end of the cat litter box, the feces collection bag is provided on the feces discharge port, the feces discharge port is close to the filter screen and is communicated with the front cavity, the rear end of the cat litter box bulges upwards and a flipping supporting end is provided therein, the flipping supporting end is communicated with the rear cavity, and both a rear portion of the rear cavity and a rear portion of the cat litter box are arc-shaped. By providing the cat litter box to be arc-shaped, the flipping of the cat litter box can be realized, the structure of the cat litter box is simple and operation thereof is easy; the feces can be directly collected in the bag; and by providing the silica gel door and the foot rest, entry and exit of the pets is facilitated while out flowing of the cat litter is prevented; by providing a panel without any hole out flowing of the cat litter can be prevented, and by providing a backflow opening the cat litter can flow back to the front cavity; a litter outlet port is provided at a bottom portion of the cat litter box, and a bottom cover is covered on the litter outlet port. However, the technical solution is deficient in that, the feces discharge port is opened at the top end portion of the cat litter box, the cat litter discharge port is opened at the bottom end portion of the cat litter box, therefore, for cleaning the litter and replacing the litter different turning operations are to be performed, and litter replacement operations are troublesome.

Another Chinese utility model patent number CN214961753U published on Dec. 3, 2021 disclosed a semi-automatic rolling cat litter box, comprising a deodorization box, a ball, a muffler and a pedestal, which are sequentially provided, the deodorization box is provided on a top portion of the ball, the ball comprises an upper ball casing, a funnel, a rear fixing member for an upper casing and a lower casing, a lateral fixing member for the upper casing and the lower casing, a filter mesh and a lower ball casing, wherein the upper ball casing and the lower ball casing are connected via the rear fixing member for the upper casing and the lower casing and the lateral fixing member for the upper casing and the lower casing; the ball can be rotated horizontally, and when rotating for half a round to the left the feces can be discharged, when rotating for half a round to the right the cat litter can be replaced, the deodorization box serves to cover the hole on the ball, no matter will be leaked, and the deodorization box is filled with deodorization agent to clean odor in the ball. In the semi-automatic cat litter box of the instant utility model, the deodorization box and the ball are fixed together by strong absorption of magnets, which is firm and makes it easy to detach them, and the structure is easy and reliable, the appearance is good and the function is good. However, the deficiency of the technical solution is that: similarly to clean the litter (discharge the feces) and change the litter (replace with new litter) the cat litter box has to be rotated and operated in different ways, which makes it difficult to control the procedure, and during rotation of the cat litter box, the hole and the pedestal will join, in some cases cats may be jammed therein, which is not safe enough.

Therefore, targeting at the foregoing problems, it is necessary to produce a further technical solution to address at least one of the foregoing problems.

SUMMARY OF THE INVENTION

The present invention aims to provide a cat litter box capable of automatic cleaning and removal, to address the deficiencies existing in the prior art.

To address the foregoing technical problems, the present invention provides the following technical solutions:

A cat litter box capable of automatic cleaning and removal, comprising a pedestal and a roller repository, and the pedestal and the roller repository are connected via a drive mechanism, the roller repository comprises a barrel, a litter storage bin is provided in the barrel, a pet entry/exit port and a waste discharge port are opened on the barrel, wherein the waste discharge port is provided at a rotation track of the barrel, a movable cover is provided outside the waste discharge port, an adjustable filter assembly is provided in between the litter storage bin and the waste discharge bin, the adjustable filter assembly comprises a fixed stopper plate, the fixed stopper plate is connected with an inner side of the barrel, a filter mesh is provided underneath the fixed stopper plate, a movable stopper plate is provided rotatably in between the fixed stopper plate and the filter mesh, a rotation button is provided at an end of the movable stopper plate, and upon rotation of the rotation button, the movable stopper plate is rotatable synchronously and fitted against the fixed stopper plate or the filter mesh.

In a preferred embodiment of the present invention, the pet entry/exit port is oriented at the adjustable filter assembly.

In a preferred embodiment of the present invention, an extension plate is provided at an edge of a top portion of the pet entry/exit port orienting at the barrel.

In a preferred embodiment of the present invention, the movable cover is connected with the barrel, and a housing cavity is formed between the movable cover and the barrel, and the housing cavity is communicated with the waste discharge port.

In a preferred embodiment of the present invention, the rotation button comprises a rotation drive component coaxially provided with a rotation shaft of the movable stopper plate, the rotation drive component comprises a first drive body and a second drive body sequentially connected together, a front end of the first drive body engages with the rotation shaft of the movable stopper plate by interpolation, a through-hole is provided at a portion of the barrel orienting at the rotation shaft of the movable stopper plate, the first drive body passes the through-hole, the first drive body is connected transmissively with the second drive body, and by sliding the rotation drive component relative to the rotation shaft of the movable stopper plate, a rear end of the first drive body is released from or interpolated into the through-hole, a shape of the rear end of the first drive body is adaptive to a shape of the through-hole, so that when the rear end of the first drive body is inserted into the through-hole, the rotation drive portion can be circumferentially fixed relative to the barrel.

In a preferred embodiment of the present invention, a size of a cross section of the front end of the first drive body is bigger than a size of a cross section of the rear end of the first drive body.

In a preferred embodiment of the present invention, at least one spring is provided in between the front end of the first drive body and the rotation shaft of the movable stopper plate, and by compressing or releasing the at least one spring the rear end of the first drive body is released from or interpolated into the through-hole.

In a preferred embodiment of the present invention, the fixed stopper plate and the filter mesh are provided to be coplanar and parallel, and the through-hole comprises an ellipse, and the rear end of the first drive body is adaptive to the through-hole.

In a preferred embodiment of the present invention, the second drive body comprises a circular rod, and a diameter of the second drive body is not bigger than a minor axis of the ellipse.

In a preferred embodiment of the present invention, another end of the movable stopper plate is rotatably connected with an inner surface of the barrel.

Compared with the prior art, the beneficial effects of the present invention are:
(1) In the present invention, by providing the adjustable filter assembly in between the litter storage bin and the waste discharge port, that is, providing the fixed stopper plate, the filter mesh, and the movable stopper plate provided between them, and connecting the rotation button at one end of the movable stopper plate, under action of the rotation button, the movable stopper plate can be rotated and fitted against the fixed stopper plate or the filter mesh, in this way, the two filtering actions can be done with the present adjustable filter assembly, in addition, the rotation direction of the barrel is unified, in the first case, by fitting the movable stopper plate over the fixed stopper plate, and with the filter mesh, the big agglomeration in the litter to be filtered can be removed, in the second case, by fitting the movable stopper plate over the filter mesh, with the movable stopper plate the litter to be filtered will be totally removed, and the structure is simple, the operation is convenient.
(2) In the present invention, by adjusting the orientation of the pet entry/exit port toward the adjustable filter assembly, the space between the adjustable filter assembly and the pet entry/exit port will be larger, pet relieving comfort will be improved and pet of different sizes can use this litter box.
(3) In the present invention, by providing an extension plate at a top end of the pet entry/exit port orienting at the barrel, leakage of the waste filtered by the adjustable filter assembly through the pet entry/exit port can be prevented and environment pollution can be prevented.
(4) In the present invention, by connecting the movable cover and the barrel, forming a housing cavity in between the movable cover and the barrel and configuring the housing cavity to be communicating with the waste discharge port, during rotation of the roller, the waste discharge port does not intersect with the pedestal, so the cat will not be jammed, in addition, by providing the waste discharge port and the pet entry/exit port separately, even if the pet enters the housing cavity, the pet can jump out through the always open pet entry/exit port, so as to avoid overstay of the pet in the cat litter box, and in this way, safety is further improved.
(5) In the present invention, by providing the first drive body, the second drive body, the through-hole and designing of the configurations and sizes thereof, the rotation drive component can drive the movable stopper plate to fit against the fixed stopper plate or the filter mesh, which is of simple structure and convenient operations; further, by providing the size of the cross section of the front end of the first drive body to be bigger than the size of the cross section of the rear end of the first drive body, falling off of the rotation drive component from the through-hole is avoided; in the meanwhile, by providing the spring in between the first drive body and the rotation shaft of the movable stopper plate, the resistance required for the user to push the rotation drive component inward is increased, user experience is improved and erroneous operation can be avoided; by configuring the through-hole to be elliptical, and configuring the rear end of the first drive body adaptively, and configuring the fixed stopper plate and the filter mesh to be coplanar or parallel, after rotating the rotation button for 180° the rear end of the first drive body can be interpolated into the through-hole to reach the movable stopper plate and be fitted against the filter mesh. The operation is fast and user experience is good.
(6) In the present invention, by providing another end of the movable stopper plate to be rotatably connected with an inner side of the barrel, both ends of the movable stopper plate are properly supported and the connection firmness of the movable stopper plate is improved.

BRIEF DESCRIPTION OF DRAWINGS

To illustrate the technical solutions in the embodiments of the present invention or in the prior art to a better extent, hereinafter a brief introduction will be given to the drawings to be used in the description of the embodiments or the prior art, apparently, the drawings show only some of the embodiments of the present invention, and for those of ordinary skill in the art, without paying creative effort, it is possible to obtain other drawings based on the drawings provided here.

Figure 1:
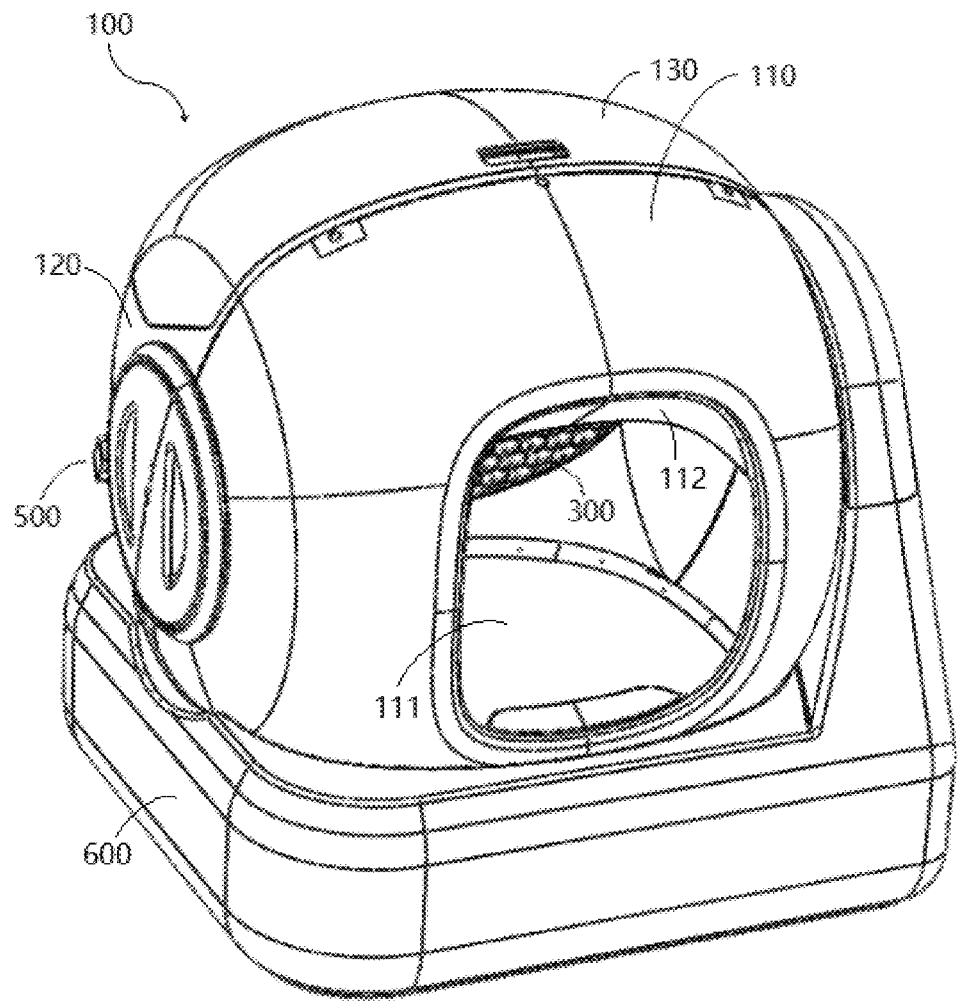
FIG. 1 is a structural diagram showing the present invention.

Specifically, 100 roller repository; 110 front casing; 111 pet entry/exit port; 112 extension plate; 120 rear casing; 121 through-hole; 122 waste discharge port; 130 movable cover;
200 fixed stopper plate;
300 filter mesh
400 movable stopper plate; 410 rotation portion; 420 reinforcing rib;
500 rotation button; 510 rotation drive portion; 511 first drive body; 512 second drive body; 520 spring; 530 rotation piece;
600 pedestal;
700 drive mechanism; and
800 litter storage bin.

EMBODIMENTS

Hereinafter a clear and complete description will be given to the technical solutions in embodiments of the present invention in conjunction with the drawings of the embodiments of the present invention, apparently, the embodiments given here are merely some rather than all of the embodiments of the present invention. Based on the embodiments of the present invention, all other embodiments obtained by those of ordinary skill in the art without paying creative effort fall into the protection scope of the present invention.

In the description of the present invention, it is to be understood that, spatial relationships or orientations indicated by terms "central", "longitudinal", "transverse", "upper", "lower", "front", "rear", "left", "right", "vertical", "horizontal", "top", "bottom", "inner" and "outer" are spatial relationships or orientations as shown in the drawings to facilitate description of the present invention and ease description, rather than to indicate or imply that the purported device or component must have a specific orientation, be constructed and operated in the specific orientation, and shall not be construed as limitations to the protection scope of the present invention.

In the description of the present invention, it is to be noted that, unless indicated otherwise, terms "install", "connect" and "link" shall be understood broadly, for example, the connection can be fixed connection or detachable connection or integral connection; the connection can be mechanical connection or electrical connection; the connection can be direct connection or connection via an intermediate medium, and the connection can also be communication of two parts. For those of ordinary skill in the art, specific contents of the foregoing terms in the present invention can be understood in the specific context of the present invention.

Embodiment 1

Figure 2:
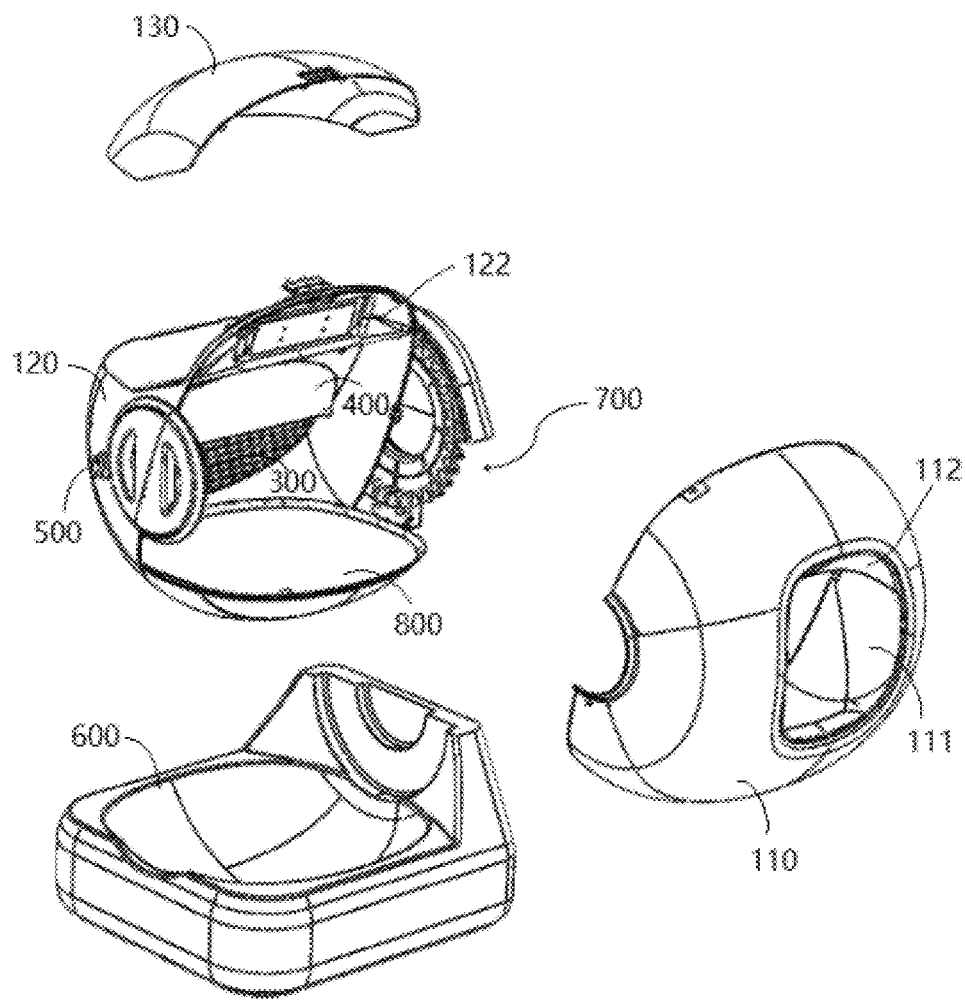
FIG. 2 is an exploded diagram showing the present invention.

As shown in FIGS. 1 and 2, an automatic cleaning and replacing cat litter box, comprising a pedestal 600 and a roller 100, and the pedestal 600 and the roller 100 are connected via a drive mechanism 700, the drive mechanism 700 drives the roller 100 on the pedestal 600 to rotate. The roller 100 comprises a barrel, wherein the barrel comprises a front casing 110 and a rear casing 120 that are spliced together, in this way, installation and detachment of internal components is facilitated. A litter storage bin 800 and an adjustable filter assembly are provided in the barrel, a pet entry/exit port 111 and a waste discharge port 122 are provided on the barrel, the waste discharge port 122 is provided on a rotation track of the barrel, the adjustable filter assembly is provided in between the litter storage bin 800 and the waste discharge port 122, by rotation of the barrel, the litter to be filtered in the litter storage bin 800 can be driven to pass the adjustable filter assembly and is discharged through the waste discharge port 122, in this way, litter cleaning and replacement is done. Furthermore, in the cat litter box, there is only one waste discharge port 122, and in such case, during litter cleaning and replacement, the rotation direction of the barrel is one-way, which is contrary to operations of most of cat litter boxes that by forward movement the litter can be cleaned and by reverse movement the litter can be removed, the operation is convenient, the structure is simple and the technical bias in the present technical field is broken through.

For the drive mechanism 700 the prior art has disclosed corresponding structures, and the purpose is to drive the roller 100 to rotate, for example, the drive mechanism 700 may comprise a motor and a gear drive component connected with the motor, wherein at least one gear is connected with a drive end of the motor, another gear engaging with the at least one gear is connected with the barrel so as to drive the barrel to rotate.

A movable cover 130 is provided at an outer side of the waste discharge port 122, further, the movable cover 130 is connected with the barrel, a housing cavity is formed in between the movable cover 130 and the barrel, the housing cavity is communicated with the waste discharge port 122, the housing cavity for housing wastes rotates synchronously with the barrel, so that the waste discharge port 122 will not intersect with the pedestal 600 during rotation of the roller 100, the pet will not be jammed. Furthermore, the waste discharge port 122 and the pet entry/exit port 111 are provided separately, so that, even when the pet enters wrongly the housing cavity, the pet can jump out from the pet entry/exit port 111 and will not be stuck in the cat litter box, the usage safety is improved. A waste bag can be provided in the housing cavity, an open end of the waste bag can be connected with the waste discharge port 122 so as to collect the wastes. The movable cover is preferably connected detachably with the barrel so as to facilitate replacement of the waste bag.

Figure 3:
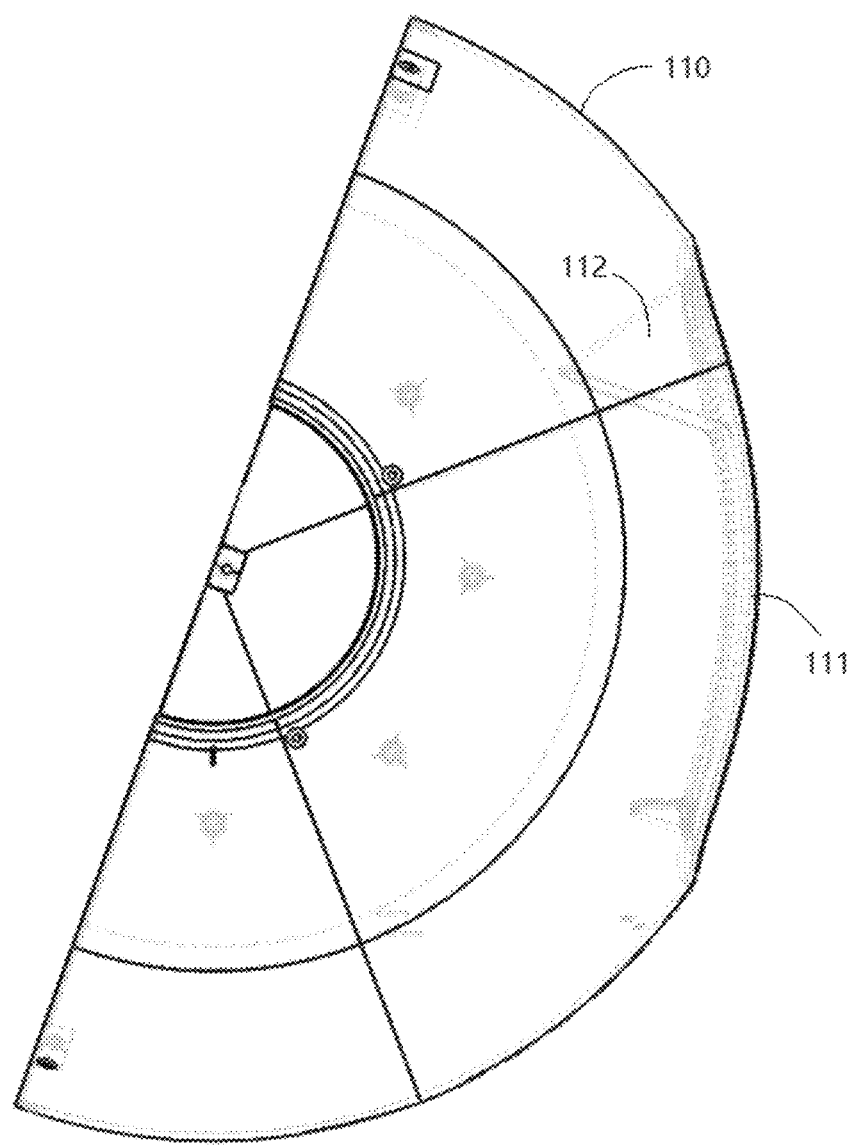
FIG. 3 is a perspective diagram showing a front cavity according to the present invention.

In the present embodiment, the pet entry/exit port 111 is oriented at the adjustable filter assembly, so that the space in between the adjustable filter assembly and the pet entry/exit port 111 is bigger, pet relieving comfort can be improved and pets of more sizes can use this litter box. As shown in FIG. 3, an extension plate 112 is provided at an edge of a top end portion of the pet entry/exit port 111, the extension plate 112 is oriented at inside the barrel, so that during litter cleaning or removing, the waste filtered by the adjustable filter assembly can be limited in between the waste discharge port 122 and the extension plate 112, the leakage of the waste through the pet entry/exit port 111 and environment pollution can be prevented.

Figure 4:
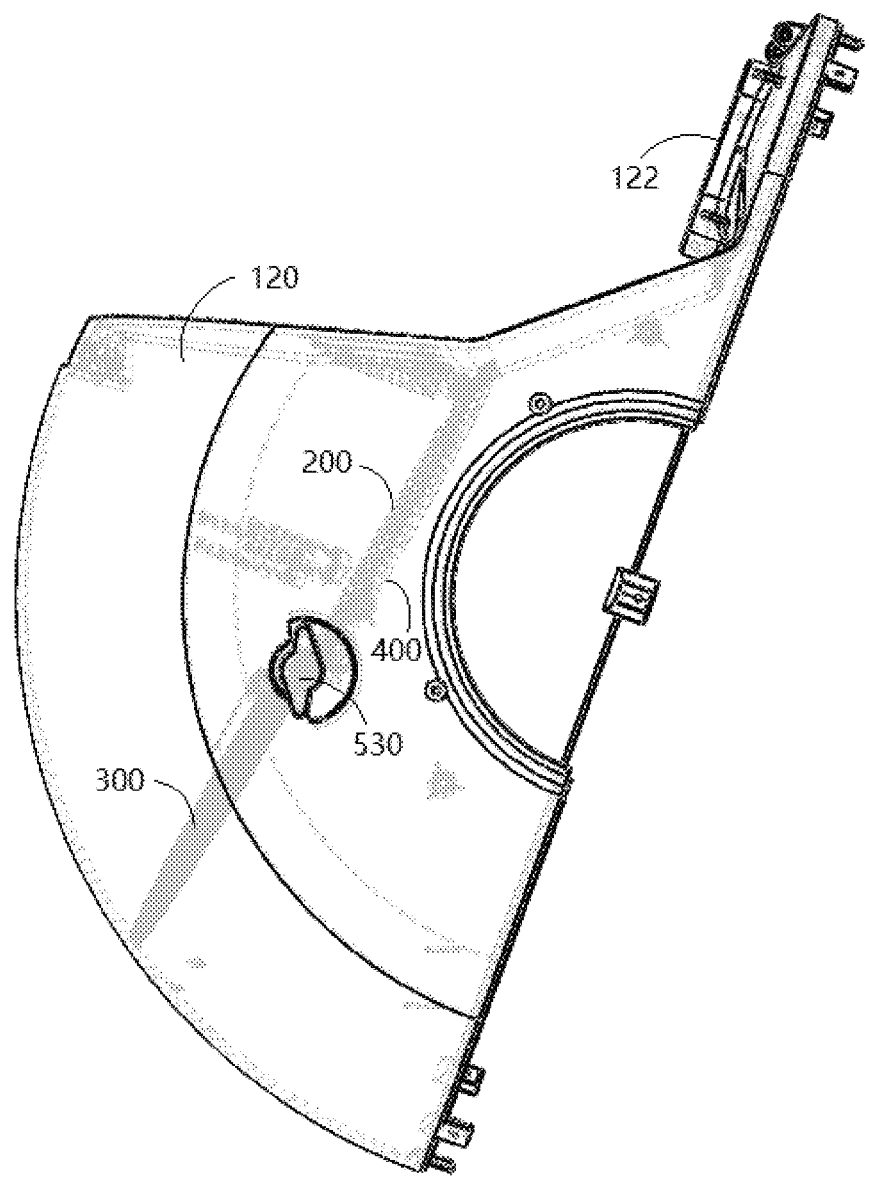
FIG. 4 is a perspective diagram showing a rear cavity and an adjustable filter assembly according to the present invention.
Figure 5:
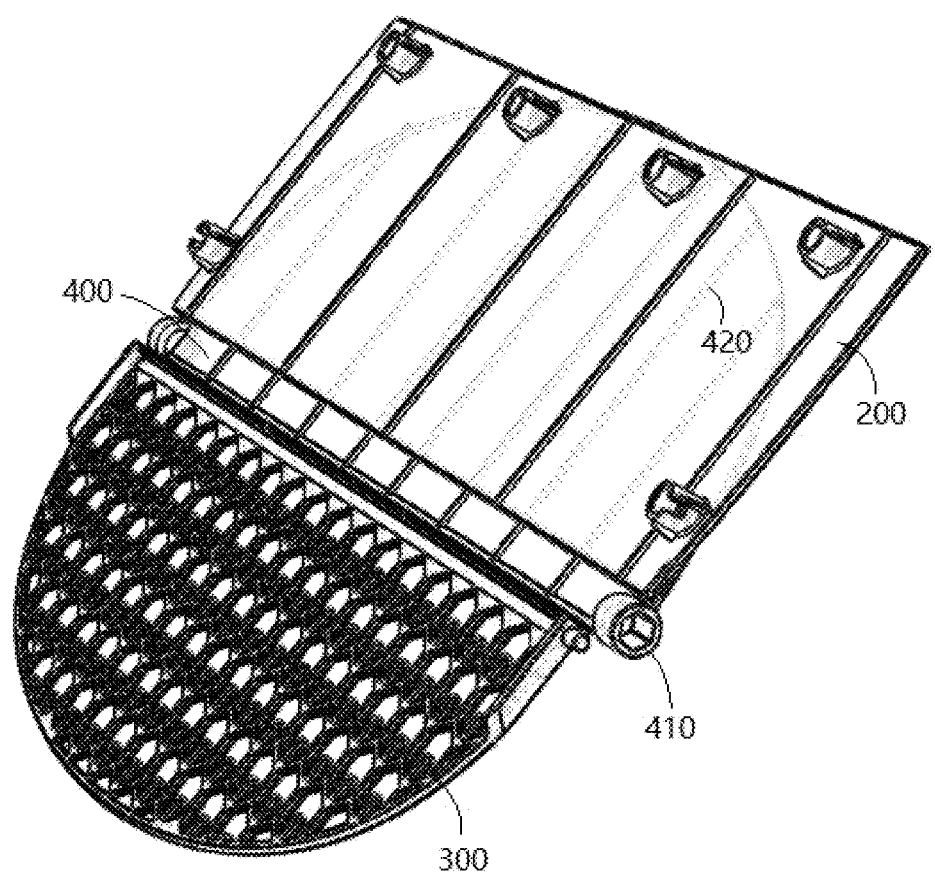
FIG. 5 is a structural diagram showing some parts of the adjustable filter assembly according to the present invention.

As shown in FIGS. 4 and 5, the adjustable filter assembly comprises a fixed stopper plate 200, and the fixed stopper plate 200 is fixed on an inner side of the barrel. A filter mesh 300 is provided underneath the fixed stopper plate 200, generally, the fixed stopper plate 200 and the filter mesh 300 are provided to be coplanar or parallel, and the fixed stopper plate 200 and the filter mesh 300 can be two parts or can be integrally formed. In the present embodiment, the fixed stopper plate 200 and the filter mesh 300 are two individual components, the filter mesh 300 is provided underneath the fixed stopper plate 200 and they are parallel. A movable stopper plate 400 is provided in between the fixed stopper plate 200 and the filter mesh 300, a rotation button 500 is connected at an end of the movable stopper plate 400, so that upon operations of the rotation button 500 the movable stopper plate 400 can move synchronously, and the movable stopper plate 400 is fitted against the fixed stopper plate 400 or the filter mesh 300. The adjustable filter assembly is configured to realize the following two filter operations, the first one, the movable stopper plate 400 is fitted closely against the fixed stopper plate 200, and by the filter mesh 300 large agglomerations in the litter to be filtered can be removed, for the second one, the movable stopper plate 400 is fitted against the filter mesh 300, and by the movable stopper plate 400 all of the litter to be filtered will be removed. It shall be understood that, to realize filtration, gaps between the filter mesh 300, the fixed stopper plate 200 or the movable stopper plate 400 shall be as small as possible to avoid having the litter to be filtered or large agglomerations to fall off from the gaps.

Figure 6:
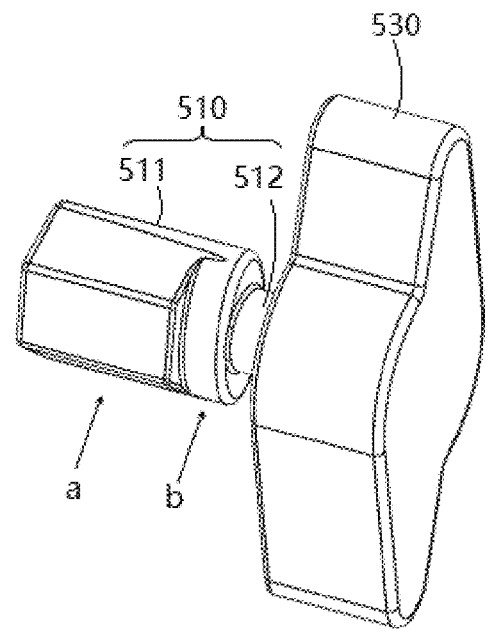
FIG. 6 is a structural diagram showing another part of the adjustable filter assembly according to the present invention.
Figure 7:
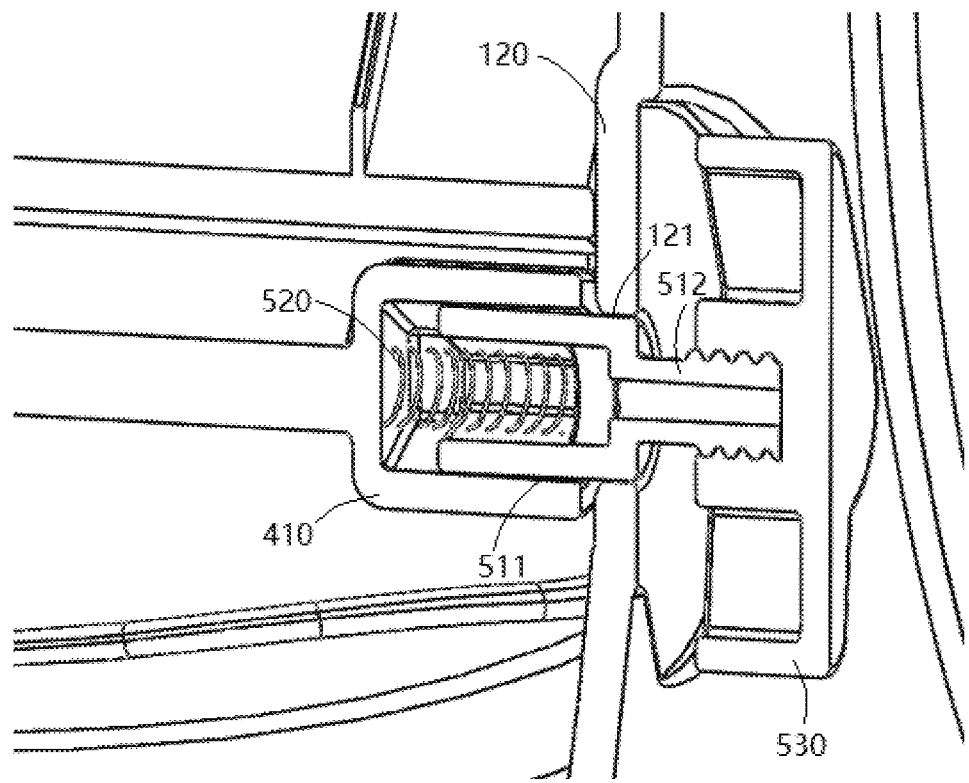
FIG. 7 is a cross-sectional diagram showing the adjustable filter assembly according to the present invention.

As shown in FIGS. 6 and 7, the rotation button 500 comprises a rotation drive portion 510 coaxially provided with a rotation shaft 410 of the movable stopper plate 400. The rotation drive portion 510 comprises a first drive body 511 and a second drive body 512 sequentially connected together, the first drive body 511 comprises a front end as marked with an arrow a and a rear end as marked with an arrow b. To ease manual operation of the user, a rotation piece 530 is connected with the second drive body 12, however, the configuration of the second drive body 12 is not limited to this, the second drive body 512 can be connected with a controller via other transmission components to realize intelligent operation.

The front end of the first drive body 511 engages with the rotation shaft 410 of the movable stopper plate 400 by interpolation, in the present embodiment, both the front end and the rotation shaft 410 are hollow pillars, and the front end is interpolated in the rotation shaft 410 and can slide therein, and the configurations of the front end and the rotation shaft 410 are not limited to this, that is, the movable stopper plate 400 and the rotation drive portion 510 rotate synchronously, a shape of the front end of the first drive body 511 and a shape of the rotation shaft 410 of the movable stopper plate 400 are adaptive non-circular shapes, for example, polygonal, elliptical or other irregular shapes, preferably, regular hexagon.

A through-hole 121 is provided at the barrel oriented toward a rotation shaft 410 of the movable stopper plate 400, the first drive body 511 passes the through-hole 121 and is transmissively connected with the second drive body 512. By sliding the rotation drive portion 510 relative to the rotation shaft 410 of the movable stopper plate 400 the rear end of the first drive body 511 is released or interpolated into the through-hole 121, a shape of the rear end of the first drive body 511 is adaptive to a shape of the through-hole 121, so that when the rear end of the first drive body 511 is interpolated into the through-hole 121, the rotation drive portion 510 can be circumferentially fixed relative to the barrel. For example, the shape of the rear end of the first drive body 511 and the shape of the through-hole 121 are non-circular, so that when the rear end of the first drive body 511 is inserted into the through-hole 121, the rotation drive portion 510 is fixed relative to the barrel, for example, the shape of the rear end of the first drive body 511 and the shape of the through-hole 121 are polygonal, elliptical or other irregular shapes, preferably, elliptical, in this way, the rear end of the first drive body 511 and the through-hole 121 are adaptive to the fixed stopper plate 200 and the filter mesh 300 that are parallel, so that after rotating the rotation button 500 for 180° the rear end of the first drive body 511 can be inserted into the through-hole 121, so as to reach the movable stopper plate 400 and be fitted against the movable stopper plate 400 or the filter mesh 300, the operation is convenient and the user experience is good. In the meanwhile, by rotating synchronously the movable stopper plate 400 and the rotation drive portion 510, the movable stopper plate 400 can be fixed relative to the barrel, and in this way the movable stopper plate 400 can be held in a certain degree and be fitted against the fixed stopper plate 200 or the filter mesh 300.

A size of the second drive body 512 is not bigger than a size of the through-hole. In the present embodiment, the through-hole 121 is elliptical, the second drive body 512 is a circular rod, and a diameter of the second drive body is not bigger than a minor axis of the through-hole 121, so that the user can hold the rotation piece 530 and press inward to release the rear end of the first drive body 511 from the through-hole 121, position limitation is thus released, rotating the rotation piece 530 for 180°, pulling the rotation piece 530 outwards until the rear end of the first drive body 511 is interpolated in the through-hole 121 to realize position limitation. In the present embodiment, a dimension of a cross section of the front end of the first drive body 511 is bigger than a dimension of a cross section of the rear end of the first drive body 511, the through-hole 121 is adaptive to the rear end of the first drive body 511, and outward movement and release of the rotation drive portion 510 can be prevented. Specifically, the front end of the first drive body 511 is a regular hexagon and the rear end of the first drive body 511 is an ellipse.

Embodiment 2

On the basis of embodiment 1, in the present embodiment, the adjustable filter assembly further comprises at least one spring 520. As shown in FIG. 7, the at least one spring 520 is provided in between the front end of the first drive body 511 and the rotation shaft 410 of the movable stopper plate 400, by compressing or releasing the at least one spring 520 the rear end of the first drive body 511 is released from or interpolated into the through-hole 121, resistance met when the user pulls the rotation drive portion 510 inwards is increased, so user experience is improved and erroneous operation can be avoided. In the present embodiment, both the front end of the first drive body 511 and the rotation shaft 410 are regular hollow hexagon, the at least one spring 520 is provided in the cavity, so as to improve axial deformation stability of the at least one spring 520. Further, it is known that, the gap between the front end of the first drive body 511 and the rotation shaft 410 of the movable stopper plate 400 is sufficient to have the rear end of the first drive body 511 to leave the through-hole 121 after compressing the at least one spring 520.

Another end of the movable stopper plate 400 is rotatably connected with the inner surface of the barrel, both ends of the movable stopper plate 400 are properly supported, and the connection stability of the movable stopper plate 400 is improved. A plurality of reinforcing ribs 420 are provided at a side of the movable stopper plate orienting at the fixed stopper plate 200, and the strength of the movable stopper plate 400 is improved. In addition, a longitudinal direction of the plurality of reinforcing ribs 420 is perpendicular to the rotation shaft of the movable stopper plate 400, so that when the movable stopper plate 400 is attached to the filter mesh 300, a flow direction of the litter to be filtered will be guided by the plurality of reinforcing ribs 420, and litter cleaning efficiency is improved.

In summary, in the present invention, by providing the adjustable filter assembly in between the litter storage bin and the waste discharge port, that is, the fixed stopper plate, the filter mesh and the movable stopper plate provided rotatably between them, further, connecting the rotation button at an end of the movable stopper plate, and synchronous rotation of the movable stopper plate driven by the rotation button and attachment of the movable stopper plate to the fixed stopper plate or the filter mesh, two filtering operations can be realized with the present adjustable filter assembly, and the rotation direction of the barrel is only one-way, for the first one, by attaching the movable stopper plate to the fixed stopper plate the large matters in the litter to be filtered can be removed, for the second case, by attaching the movable stopper plate to the filter mesh, with the movable stopper plate all of the litter to be filtered can be cleaned out, and the structural design of the present invention is simple and the operation thereof is easy.

Further, it shall be understood that, although the present invention is described in accordance with embodiments, not all embodiments contain only an individual embodiment, the narration of the specification is only for the sake of clarity, those skilled in the art shall take the specification as an entirety, the technical solutions in the embodiments of the present invention can also be appropriately combined to form other embodiments that those skilled in the art can understand.

The invention claimed is:

1. A cat litter box capable of automatic cleaning and removal, comprising a pedestal and a roller repository, and the pedestal and the roller repository are connected via a drive mechanism, the roller repository comprises a barrel, a litter storage bin is provided in the barrel, a pet entry/exit port and a waste discharge port are opened on the barrel, wherein the waste discharge port is provided at a rotation track of the barrel, a movable cover is provided outside the waste discharge port, an adjustable filter assembly is provided in between the litter storage bin and the waste discharge bin, the adjustable filter assembly comprises a fixed stopper plate, the fixed stopper plate is connected with an inner side of the barrel, a filter mesh is provided underneath the fixed stopper plate, a movable stopper plate is provided rotatably in between the fixed stopper plate and the filter mesh, a rotation button is provided at an end of the movable stopper plate, and upon rotation of the rotation button, the movable stopper plate is rotatable synchronously, and fitted against the fixed stopper plate or the filter mesh.

2. The cat litter box capable of automatic cleaning and removal according to claim 1, wherein the pet entry/exit port is oriented at the adjustable filter assembly.

3. The cat litter box capable of automatic cleaning and removal according to claim 2, wherein an extension plate is provided at an edge of a top portion of the pet entry/exit port orienting at the barrel.

4. The cat litter box capable of automatic cleaning and removal according to claim 1, wherein the movable cover is connected with the barrel, and a housing cavity is formed between the movable cover and the barrel, and the housing cavity is communicated with the waste discharge port.

5. The cat litter box capable of automatic cleaning and removal according to claim 1, wherein the rotation button comprises a rotation drive component coaxially provided with a rotation shaft of the movable stopper plate, the rotation drive component comprises a first drive body and a second drive body sequentially connected together, a front end of the first drive body engages with the rotation shaft of the movable stopper plate by interpolation, a through-hole is provided at a portion of the barrel orienting at the rotation shaft of the movable stopper plate, the first drive body passes the through-hole, the first drive body is connected transmissively with the second drive body, and by sliding the rotation drive component relative to the rotation shaft of the movable stopper plate, a rear end of the first drive body is released from or interpolated into the through-hole, a shape of the rear end of the first drive body is adaptive to a shape of the through-hole, so that when the rear end of the first drive body is inserted into the through-hole, the rotation drive portion can be circumferentially fixed relative to the barrel.

6. The cat litter box capable of automatic cleaning and removal according to claim 5, wherein a size of a cross section of the front end of the first drive body is bigger than a size of a cross section of the rear end of the first drive body.

7. The cat litter box capable of automatic cleaning and removal according to claim 6, wherein at least one spring is provided in between the front end of the first drive body and the rotation shaft of the movable stopper plate, and by compressing or releasing the at least one spring the rear end of the first drive body is released from or interpolated into the through-hole.

8. The cat litter box capable of automatic cleaning and removal according to claim 7, wherein the fixed stopper plate and the filter mesh are provided to be coplanar and parallel, and the through-hole comprises an ellipse, and the rear end of the first drive body is adaptive to the through-hole.

9. The cat litter box capable of automatic cleaning and removal according to claim 8, wherein the second drive body comprises a circular rod, and a diameter of the second drive body is not bigger than a minor axis of the ellipse.

10. The cat litter box capable of automatic cleaning and removal according to claim 5, wherein at least one spring is provided in between the front end of the first drive body and the rotation shaft of the movable stopper plate, and by compressing or releasing the at least one spring the rear end of the first drive body is released from or interpolated into the through-hole.

11. The cat litter box capable of automatic cleaning and removal according to claim 10, wherein the fixed stopper plate and the filter mesh are provided to be coplanar and parallel, and the through-hole comprises an ellipse, and the rear end of the first drive body is adaptive to the through-hole.

12. The cat litter box capable of automatic cleaning and removal according to claim 11, wherein the second drive body comprises a circular rod, and a diameter of the second drive body is not bigger than a minor axis of the ellipse.

13. The cat litter box capable of automatic cleaning and removal according to claim 1, wherein another end of the movable stopper plate is rotatably connected with an inner surface of the barrel.

* * * * *